United States Patent [19]
Kershaw et al.

[11] Patent Number: 4,884,844
[45] Date of Patent: Dec. 5, 1989

[54] DOUBLE STAGE TAUMEL GEAR REDUCTION UNIT

[75] Inventors: Peter Kershaw, London; Beo Meixner, Oshawa; Gordon Olmstead, London, all of Canada

[73] Assignee: Magna International Inc., Markham, Canada

[21] Appl. No.: 238,396

[22] Filed: Aug. 31, 1988

[30] Foreign Application Priority Data

Sep. 1, 1987 [CA] Canada ................................. 545846

[51] Int. Cl.$^4$ ............................................. B60N 1/06
[52] U.S. Cl. ...................................... 297/362; 74/804
[58] Field of Search ............................ 297/362; 74/804

[56] References Cited

U.S. PATENT DOCUMENTS

| | | | |
|---|---|---|---|
| 2,666,345 | 1/1954 | Amberg | 74/804 |
| 3,401,979 | 9/1968 | Putsch | 297/362 |
| 3,423,785 | 1/1969 | Pickles | 297/362 |
| 4,155,276 | 5/1979 | Fengler | 74/804 |
| 4,196,931 | 4/1980 | Werner | 297/362 |
| 4,366,983 | 1/1983 | Kluebing et al. | 297/362 |
| 4,371,207 | 2/1983 | Wilking | 297/362 X |
| 4,469,375 | 9/1984 | Boyer | 297/362 |
| 4,705,318 | 11/1987 | Yamada et al. | 297/362 |

FOREIGN PATENT DOCUMENTS

| | | | |
|---|---|---|---|
| 2834707 | 12/1979 | Fed. Rep. of Germany | 297/362 |
| 2578601 | 9/1986 | France | 297/362 |

Primary Examiner—Peter R. Brown
Attorney, Agent, or Firm—Ivor M. Hughes

[57] ABSTRACT

A modular taumel reduction device having a housing having internally positioned integrally formed teeth in one embodiment, further containing therewithin at least two concentric planetary gears in communication with each other which rotate and wobble individually within the housing and reduce the input from a preferably flat motor to, in one embodiment, a seat back.

58 Claims, 6 Drawing Sheets

DOUBLE STAGE TAUMEL GEAR REDUCTION UNIT

FIELD OF THE INVENTION

This invention relates to reduction units which reduce the output speed of a rotating member in relation to the input speed of a rotating member. Such devices will find particular application within the automotive industry and specifically for use in a seat recliner.

BACKGROUND OF THE INVENTION

Single staged taumel gear reduction units are well known in the art. Such reduction mechanisms take advantage of the wobbling of an off-centered gear within a housing, the off-centered gear and the housing having compatible teeth disposed upon their engaging surfaces. Typically in a taumel gear arrangement there exists between the center gear and the housing at least one tooth difference, that is to say that the centered gear has at least one less tooth than the teeth disposed upon the housing. Thus, the off-centered gear is free and under no constraint to rotate at the same speed as an input shaft driving it about the housing. Conventionally, the drive shaft engages a cam which as a result of its eccentricity further engages the centered gear which wobbles about the housing. The relationship between the number of teeth upon the housing and the number of teeth upon the centered gear is defined thereby providing a ratio of the speed reduction available when using the taumel principle. For example, if a ring gear had 51 teeth and the central gear had 50 teeth, the output speed of the central gear as it wobbled about the ring gear would be a 50 times reduced speed to that of the input speed provided. A pin coupling may be used to transmit the rotation of the central gear.

U.S. Pat. No. 3,401,979 by Putsch discloses such a taumel arrangement for use in motor vehicle seats having a toothed ring gear in communication with an externally toothed gear wherein there exists at least a one tooth differential in the diameter of the toothed gear in relationship to the ring gear. An eccentric portion cooperates with the gears in order to move the back rest and adjust its final position. However, the aforementioned patent does not describe an effective dual stage reduction. Further in relation to FIG. 9 as described in column 6 at lines 53 through to 59, a second stage of reduction is provided being considerably more cumbersome than the instant invention.

U.S. Pat. No. 3,423,785 by Pickles discloses a position control mechanism incorporating an eccentric mounting using a rotary friction element which takes advantage of the aforementioned taumel principle in operation. Again, the aforementioned patent does not disclose a dual stage reduction unit, nor does it disclose a motorized version of the alternative embodiments of the aforementioned invention.

U.S. Pat. No. 4,196,931 by Werner discloses a hinge for adjustably mounting a back rest component on a seat having two spur gears which are eccentrically rotatable within the hinge elements but are connected together for joint turning. The patented invention is best understood in relation to FIG. 1 illustrating the common drive shaft extending through the two spur gears 23 and 24 which may have alternative cam surfaces or eccentrics as illustrates in relation to FIG. 4 at items 40 and 41, but nonetheless which rotate upon a common shaft. Referring to column 6 at lines 40 through 56, a full description of the operation of the spur gears in relation to the internal gear annular 14 and 15 is found. However, there is no description of a dual stage reduction as provided in the instant invention. Further, a motorized version is not embodied nor described.

U.S. Pat. No. 4,371,207 by Wilking further describes a position adjuster for motor vehicle seats and windows having two levers with a ring gear mounted on one and a planetary gear mounted on the other having a wedge-like segments urging one into relationship with the other. Again there is an eccentric mounting which provides for the application of the taumel principle embodied in the aforementioned invention. However, again there is no two stage reduction nor is there a powered alternative embodied in a compact fashion for the aforementioned invention.

U.S. Pat. No. 4,469,375 by Boyer discloses a power hinge recliner using the taumel principle but providing merely a single stage reduction using the taumel principle wherein further reduction is provided by a worm and a worm wheel for driving the eccentric cam resulting in a much more complex structure that the instant invention. Referring to FIGS. 1 and 8 which best described the preferred and alternative embodiments of the invention it can be readily seen that a very much complicated device is disclosed which utilized the taumel principle along with the use of planetary and worm gears for use in the reduction of the speed in the first stage prior to the wobbling motion of the taumel gear which ultimately reduces the speed of the input shaft to that which would adjust the seat back to the appropriate position. However, within the instant invention the taumel principle is used in a dual stage reduction unit embodied within a module which has the advantages of fitting within very tight or limited locations, and is considerably easier to mount, fabricate and manufacture.

Nowhere is there found within the prior art a dual stage taumel gear reduction unit which is embodied in a module which provides the reduction of the input speed provided by either a hand or a motorized input through to an output which may be readily used to regulate a window regulator, lock or unlock a vehicle door, or used to adjust the seat back of a vehicle seat. Further, nowhere within the prior art is found a compact package, as found in most hand actuated taumel gear arrangements having a single stage reduction, which provides a dual stage reduction in the speed ratios of an input and an output.

Therefore, it is an object of this invention to provide a dual stage taumel gear reduction module in a compact package.

It is a further object of the invention to provide an economical dual stage reduction unit which is easy to manufacture and reliable in use.

It is a further object of the invention to provide a dual stage reduction module which is sized to fit within limited space requirements as posed by vehicle construction today.

It is still a further object of the invention to provide a flat motor which compatibly integrates with the dual stage reduction unit thereby providing a complete module which may be mounted for use in automotive and non-automotive applications.

It is yet still a further object of the invention to provide a modular powered seat recliner adjuster which meets all of the aforementioned objectives.

Further and other objects of this invention will become apparent to a man skilled in the art when considering the following summary of the invention and the more detailed description of the preferred embodiments illustrated herein.

SUMMARY OF THE INVENTION

According to one aspect of the invention a modular taumel reduction device is provided, the taumel reduction device comprising a housing having an exterior surface, interior surface and at least two ends, preferably the housing being substantially cylindrical in shape having an inside diameter and an outside diameter, the housing having an opening extending from end to end along a first axis of extension through the opening of the housing, the housing having mounting means disposed proximate the exterior surface thereof, the interior surface of the housing having a multiplicity of detent means disposed thereupon, preferably the multiplicity of detent means being a multiplicity of teeth extending upwardly away from the interior of the housing, the housing having disposed at one end thereof driving means preferably extending along a substantially parallel axis of extension as the housing, the driving means extending at least partially into the opening of the housing, preferably the driving means being a preferably flat electric motor, the driving means having first engagement means extending therefrom proximate the housing for engagement with a first driven means, preferably the first engagement means extending through an opening in the first driven means, the opening of the first driven means extending along a second axis, and the first engagement means of the driving means extending through the opening along the first axis parallel to but not coincident with the second axis, the first driven means being contained within the housing and having compatible detent means disposed about its perimeter for communication with the detent means disposed on the interior surface of the housing, the first driven means having fewer numbered compatible detent means than those disposed upon the interior surface of the housing or being smaller in diameter than said opening of said housing, preferably the detent means being teeth, the first driven means having second engagement means extending therefrom in a direction substantially parallel to the extension of the first engagement means, the second engagement means for engagement with a second driven means preferably the second engagement means extending through an opening in the second driven means, the opening of the second driven means extending along a third axis, and the second engagement means of the first driven means extending through the opening along the first axis, the second driven means being contained within the housing having compatible detent means disposed about its perimeter for communication with the detent means disposed on the interior surface of the housing, the second driven means having fewer numbered compatible detent means than those disposed upon the interior surface of the housing or being smaller in diameter than said opening of said housing, preferably the detent means being teeth, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the detent means of the first driven means intermittently engages the detent means upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the detent means of the second driven means intermittently engages the detent means upon the interior of the housing, such intermittent engagement being predetermined to effect a reduction in the speed of the second driven means with respect to the first driven means, the second driven means thereby driving the third engagement means thereof to engage at least a third driven means, a moveable frame, or lever at a substantailly reduced output speed to that of the speed of the driving means.

According to another aspect of the invention for use in a seat recliner a modular taumel reduction device is provided, the taumel reduction device comprising a housing having an exterior surface, interior surface and at least two ends, preferably the housing being substantially cylindrical in shape having an inside diameter and an outside diameter, the housing having an opening extending from end to end along a first axis of extension through the opening of the housing, the housing having mounting means disposed proximate the exterior surface thereof, the interior surface of the housing having a multiplicity of detent means disposed thereupon, preferably the multiplicity of detent means being a multiplicity of teeth extending upwardly away from the interior of the housing, the housing having disposed at one end thereof driving means preferably extending along a substantially parallel axis of extension as the housing, the driving means extending at least partially into the opening of the housing, preferably the driving means being a preferably flat electric motor, the driving means having first engagement means extending therefrom proximate the housing for engagement with a first driven means, preferably the first engagement means extending through an opening in the first driven means, the opening of the first driven means extending along a second axis, and the first engagement means of the driving means extending through the opening along the first axis parallel to but not coincident with the second axis, the first driven means being contained within the housing and having compatible detent means disposed about its perimeter for communication with the detent means disposed on the interior surface of the housing, the first driven means having fewer numbered compatible detent means that those disposed upon the interior of the housing or being smaller in diameter than said opening of said housing, preferably the detent means being teeth, the first driven means having second engagement means extending therefrom in a direction substantially parallel to the extension of the first engagement means, the second engagement means for engagement with a second driven means, preferably the second engagement means extending through an opening in the second driven means, the opening of the second driven means extending along a third axis, and the second engagement means of the first driven means extending through the opening along the first axis, the second driven means being contained within the housing having compatible detent means disposed about its perimeter for communication with the detent means disposed on the interior surface of the housing, the second drive means having fewer numbered compatible detent means than those disposed upon the interior surface of the housing or being smaller in diameter than said opening of said housing, preferably the detent means being teeth, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the detent means of the first driven means intermittently engages the detent means upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second drive means within the housing as the detent means of the second driven means intermittently engages the detent means upon the interior of the housing, such intermittent engagement being predetermined to effect a reduction in the speed of the second driven means with respect to the first driven means, the second driven means thereby driving the third engagement means thereof to engage at least a third driven means, a moveable frame or lever in communication with the seat recliner at a substantially reduced output speed to that of the speed of the driving means.

According to yet another aspect of the invention a modular taumel gear reduction device is provided, the taumel gear reduction device comprising a housing having an exterior surface, interior surface and at least two ends, preferably the housing being substantially cylindrical in shape having an inside diameter and an outside diameter, the housing having an opening extending from end to end along a first axis of extension through the opening of the housing, the housing having mounting means disposed proximate the exterior surface thereof, the interior surface of the housing having a multiplicity of teeth disposed thereupon proximate the opening, preferably the multiplicity of teeth extending upwardly away from the interior of the housing, the housing having at one end thereof driving means preferably extending along a substantially parallel axis of extension as the housing, the driving means extending at least partially into the opening of the housing, preferably the driving means being a preferably flat electric motor, the driving means having first engagement means extending therefrom proximate the housing for engagement with a first driven means, preferably the first engagement means extending through an opening in the first driven means, the opening of the first driven means extending along a second axis, and the first engagement means of the driving means extending through the opening along the first axis parallel to but not coincident with the second axis, the first driven means being contained within the housing and having compatible teeth disposed about its perimeter for communication with the teeth disposed within the interior surface of the housing, the first driven means having fewer numbered compatible teeth than those disposed upon the interior of the housing, the first driven means having second engagement means extending therefrom in a direction substantially parallel to the extension of the first engagement means, the second engagement means for engagement with a second driven means, preferably the second engagement means extending through an opening in the second driven means, the opening of the second driven means extending along a third axis, and the second engagement means of the first driven means extending through the opening along the first axis, the second driven means being contained within the housing having compatible teeth disposed about its perimeter for communication with the teeth disposed on the interior surface of the housing, the second driven means having fewer numbered compatible teeth than those disposed upon the interior of the housing, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the teeth of the first driven means intermittently engage the teeth disposed upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the teeth of the second driven means intermittently engages the teeth disposed upon the interior of the housing, such intermittent engagement being predetermined to effect a reduction in the speed of the second driven means with respect to the first driven means, the second driven means thereby driving the third engagement means thereof to engage at least a third driven means, a moveable frame, or lever at a substantially reduced output speed to that of the speed of the driving means.

According to another aspect of the invention for use in a seat recliner a modular taumel gear reduction device is provided, the taumel gear reduction device comprising a housing having an exterior surface, interior surface and at least two ends, preferably the housing being substantially cylindrical in shape having an inside diameter and an outside diameter, the housing having an opening extending from end to end along a first axis of extension through the opening of the housing, the housing having mounting means disposed proximate the exterior surface thereof, the interior surface of the housing having a multiplicity of teeth disposed thereupon, preferably the multiplicity of teeth extending upwardly away from the interior of the housing, the housing having disposed at one end thereof driving means preferably extending along a substantially parallel axis of extension as the housing, the driving means extending at least partially into the opening of the housing, preferably the driving means being a preferably flat electric motor, the driving means having first engagement means extending therefrom proximate the housing for engagement with a first driven means, preferably the first engagement means extending through an opening in the first driven means, the opening of the first driven means extending along a second axis, and the first engagement means of the driving means extending through the opening along the first axis parallel to but not coincident with the second axis, the first driven means being contained within the housing and having compatible teeth disposed about its perimeter for communication with the teeth disposed on the interior surface of the housing, the first driven means having fewer numbered compatible teeth than those disposed upon the interior surface of the housing, the first driven means having second engagement means extending therefrom in a direction substantially parallel to the extension of the first engagement means, the second engagement means for engagement with a second driven means, preferably the second engagement means extending through an opening in the second driven means, the opening of the second driven means extending along a third axis, and the second engagement means of the first driven means extending through the opening along the first axis, the second driven means being contained within the housing having compatible teeth disposed about its perimeter for communication with the teeth disposed on the interior surface of the housing, the second driven means having fewer numbered compatible teeth than those disposed upon the interior surface of the housing, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the teeth of the first driven means intermittently engage the teeth disposed upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the teeth of the second driven means intermittently engage the teeth disposed upon the interior of the housing, such intermittent engagement being predetermined to effect a reduction in the speed of the second driven means with respect to the first driven means, the second driven means thereby driving the third engagement means thereof to engage at least a third driven means, a moveable frame, or lever in communication with the seat recliner at a substantially reduced output speed to that of the speed of the driving means.

According to yet another aspect of the invention the reduction unit may comprise driven means which are gears.

According to yet another aspect of the invention the reduction unit may comprise a remote driving means in communication with the reduction unit by a flexible drive shaft engaging the reduction unit.

According to yet another aspect of the invention the reduction unit may comprise a remote driving means in communication with the reduction unit by a drive shaft engaging the reduction unit.

According to yet another aspect of the invention the reduction unit may comprise first and second driven means having substantially equivalent numbers of detent means disposed thereupon whereby the second and third axes are substantially coincident.

According to yet another aspect of the invention the reduction unit may comprise first and second driven means having a substantially equivalent number of teeth disposed thereupon whereby the second and third axes are substantially coincident.

According to yet another aspect of the invention the reduction unit may comprise first and second driven means of substantially equivalent diameters whereby the second and third axes are substantially coincident.

According to yet another aspect of the invention the reduction unit may comprise first engagement means comprising an eccentric cam in communication with the driving means.

According to yet another aspect of the invention the reduction unit may comprise second engagement means comprising a carrier plate having at one end thereof at least one pin extending therefrom proximate the first driven means for engagement therewith, and having extending therefrom at the other end remote the first driven means an eccentric cam in communication with the second driven means.

According to yet another aspect of the invention the reduction unit may comprise third engagement means comprising at least one arcuate pin extending outwardly away from the second driven means remote the driving means.

According to yet another aspect of the invention the reduction unit may comprise some components manufactured from sintered metal.

According to yet another aspect of the invention the reduction unit may comprise some components manufactured from resilient non-metallic materials.

According to yet another aspect of the invention the reduction unit may comprise an end plate closing the housing at the end thereof remote the driving means, the end plate having compatible arcuate slots therein to determine the extent of movement of the at least one arucate pin extending outwardly from the second driven means remote the driving means.

According to yet another aspect of the invention the reduction unit may comprise driving means comprising an electric motor embodying a rare earth magnet, for example a neodymium magnet, providing higher density flux.

DETAILED DESCRIPTION OF THE PREFERRED EMBODIMENTS

Figure 1:
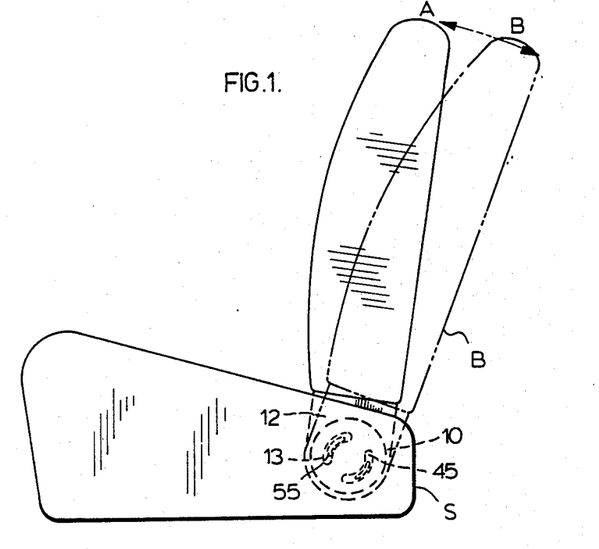
FIG. 1 is a side view of a seat recliner embodying the reduction device of the instant invention in a preferred embodiment.

Referring now to FIG. 1, a seat recliner mechanism is illustrated having a seat bench S extending substantially horizontally and having a seat back B affixed thereto and pivotable therefrom at the rear thereof. The seat back B is attached to the seat bench S by a frame portion 12 extending downwardly from the seat back B and pivotable with respect to the seat bench S from position A to position B. In the preferred embodiment, the total angular variation of seat back B is approximately 33 degrees, varying from +27 degrees of the normal to −6 degrees of the normal. It is, of course, understood that alternative inclinations are available within the instant invention and it is not intended that the aforementioned figures be limiting in any sense. Affixed to the seat back bracket 12 is the reduction unit 10 being mounted coincident with the pivot point of the seat back B. The reduction device 10 having arcuate pins 55 extending through arcuate slots 45 and being affixed by arcuate pins 55 to seat bracket 12.

Figure 2:
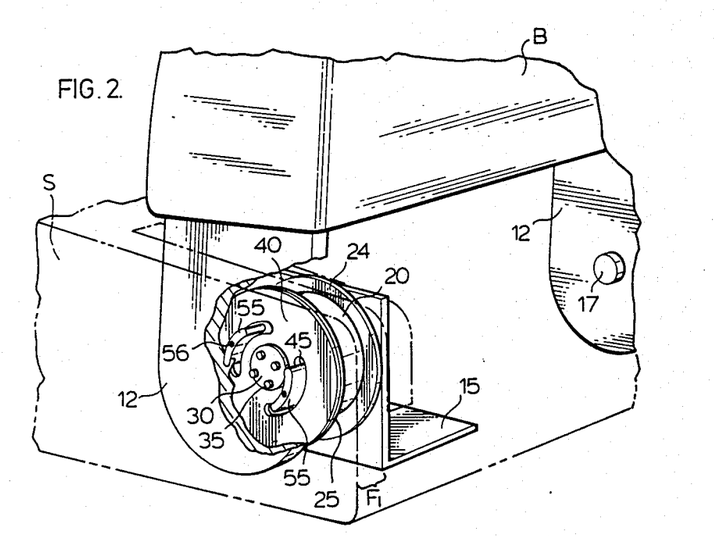
FIG. 2 is a close-up perspective view of the reduction device 10 illustrated in FIG. 1 partially cut away to illustate the components thereof in a preferred embodiment of the invention.

Referring now to FIG. 2, the reduction device 10 is illustrated in perspective being affixed to the seat back bracket 12 and arcuate pins 55 via fasteners 56. It is the movement of the arucate pins 55 within arcuate slots 45 which allow for the movement of the seat back B from positions A through to positions B, as selected by the occupant of the seat. The reduction device 10 is mounted to the seat frame at seat frame member 15, between the seat frame 15 and the seat back bracket 12. Thus it can be seen that a distance F1 is available for the mounting and insertion of the reduction device within the overall seat frame. One of the advantages of the instant invention is its ability to be installed within tight locations where space limitations such as defined by the space F1 offer a constraint on the installation. Thus, the reduction unit 10 is mounted on frame 15 within space F1, said mounting being upon flange 24 extending about the perimeter of the housing 20 of the reduction device 10. At the other end of the reduction device, acruate pins 55 are mounted to the seat bracket 12 via pins (not shown) engaging threaded opening 56. End plate 30 is provided to enclose all of the components within the reduction unit. Pins 35 connect the end plate 30 to the reduction unit 10. A pin 17 is provided to affix the seat bracket 12 remote the reduction unit to a corresponding portion of seat frame 15 (not shown) to allow for smooth, non-binding operation of the seat back B.

Figure 3:
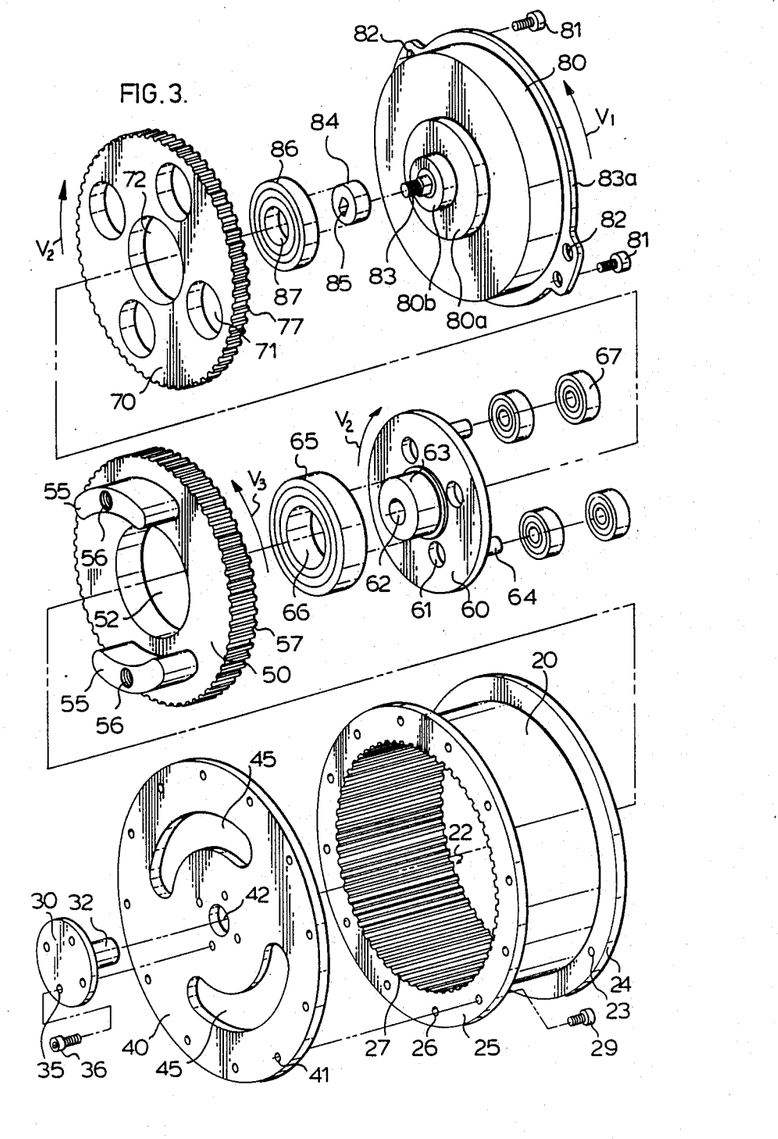
FIG. 3 is an exploded perspective view of the reduction device of FIG. 2 illustrating the disassembled components thereof in a preferred embodiment of the invention.

Referring now to FIG. 3, the components of the reduction unit 10 are illustrated in exploded perspective. A housing 20 is illustrated being of generally cylindrical shape having an opening 22 passing through the center thereof and having flanges 24 and 25 disposed at the ends of the housing 20. The flanges 24 and 25 are for mounting the reduction unit to the seat frame 15 as illustrated in FIG. 2 at flange 24 and for mounting the cover plate 40 to flange 25 at openings 26 with pins 29. Disposed within the interior of housing 20 are 61 involute teeth 27. The teeth extend from end to end of housing 20 and preferably have a pitch diameter of 101.67 mm with a pressure angle of 40 degrees. It is recommended that the teeth be case hardened as well. Although the design of the teeth of the reduction unit may vary, as well as the numbers thereof, the aforementioned design is, however, recommended.

At the other end of the housing remote the end plate 40 is affixed, a flat drive motor 80 having portions 80A and 80B respectively mounted proximate the housing and having a drive spindle 83 centrally mounted within the motor, the drive spindle 83 having mounted thereon a cam 84 mounted on spindle 83 through opening 85 and having a bearing 86 mounted about the cam 84 through opening 87 of the bearing. It is, of course, possible to not use a bearing and remain within the scope of the instant invention, however, it is recommended that bearings be used in order to reduce the amount of friction developed by the operation of the reduction unit. However, should a bearing be eliminated from the installation, the cam 84 could be of significantly larger diameter and still be allowed to operate in the required manner. It is also recommended that the bearing be press fit within first stage gear 70 prior to assembly.

Figure 9:
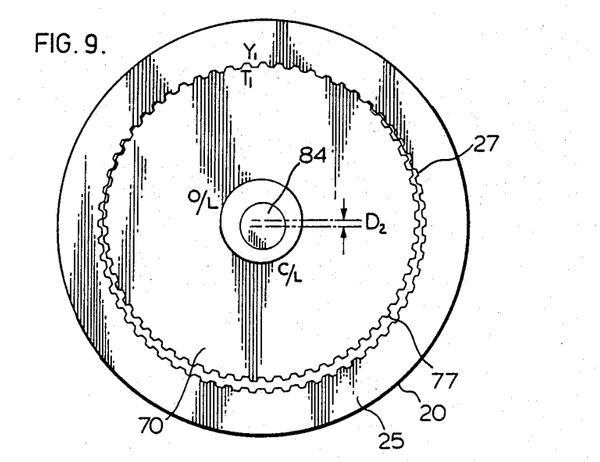
FIG. 9 is a schematic view of the interrelationship between the housing of the reduction device in the first stage gear of FIG. 8 illustrating the wobbling of the first stage gear within the housing in a preferred embodiment of the invention.

As best illustrated in relation to FIG. 9, the cam 84 is offset in relationship to the center line CL. Thus the center line of the cam 84 is offset to the center line CL by a predetermined distance and in the preferred embodiment by a distance of .833 mm. The purpose of such offset will be described in the following paragraphs.

First stage gear 70 is then connected to the motor 80 through cam 84 mounted upon bearing surface 86, however, the bearing does snugly fit within the opening 72 of first stage gear 70. Such a press fit will allow the offset cam to wobble about the openign 71 thus transferring such wobbling motion on to the first stage gear 70. It is recommended that the first stage gear be manufactured from nylon or any other softer material to improve the meshing noise characteristics of the reduction unit 10. Further, hard rubber may be used in embodying the first stage gear 70 of the instant invention. Such embodiment will enhance the operation of the aforementioned gear and thus help eliminate the disengaging or jumping of teeth of the stage gear in use.

Affixed to the first stage gear 70 at openings 71 is a carrier plate 60 having four pins 64 to be inserted within the four openings 71 wherein bearings 67 will be press fitted prior to insertion of pins 64. However, the combination of the pins 64 and the bearing 67 are smaller in diameter than the opening 71. Thus, as first stage gear 70 is in motion, such motion will be passed on to pins 64 simultaneously, the clearance between the bearing 67 and the outside walls of opening 71 being sufficient to providde this simultaneous contact of pins 64. Thus, the motion of pins 64 within openings 71 will provide a certain amount of give or flex within the system to prevent the wobbling action of the first stage gear 70 from being passed on to the carrier plate 60 thus the rotation of the motor 80 will be passed on to the carrier plate through pins 64 but the offset action of the cam 84 upon the first stage gear 70 will not.

Disposed within one end of the carrier plate 60 remote the motor 80 is a cam portion 63 having an opening 62 whose center line is coincident with the spindle 83, but having a cam surface whose center is offset a distance of .833 mm from the center line CL of reduction unit 10. A bearing 65 is disposed upon the cam 63 when assembled. It is also not necessary to have the cam and the bearing surface thereon but a singular cam offset the predetermined distance would suffice if sufficient lubrication such as a standard grease were used when assembling the reduction unit 10. However, the bearing is used and is recommended to reduce the amount of friction and increase the efficiency of the reduction unit 10. Bearing 65 will be press fit within opening 52 during assembly of the reduction unit. However, alternative methods to press fitting are strongly urged and recommended when assembling bearings and the associated cam surfaces which they circumscribe. As is well known in the art, press fitting is not a very efficient method when used in mass production in modern manufacturing techniques. The offset cam 63 and the bearing 65 are thus inserted within hole 52 of the second stage gear 50, the opening 52 is press fit to bearing 65 allowing the rotation of the cam 63 to set up a wobbling of the second stage gear 50 within housing 20 very much identical to the wobbling of the first stage gear 70 within the housing 20. However, the actual output speed of the second stage gear will be substantially reduced in relation to the input speed of the drive motor 80. First stage gear 70 and second stage gear 50 each will have disposed upon their perimeter 60 involute teeth having a pitch diameter of 100 mm and a pressure angle of 40 degrees. It is, of course, not absolutely necessary that the first stage and the second stage gear have an identical number of teeth providing that both gears have at least one less tooth than the teeth disposed within the interior of the housing 20, in this case there is one less tooth on each gear than the number of teeth found within the housing. It is just as conceivable to have more than one less tooth on at least one of or both of the first and second stage gears. It is also possible to have a third stage gear depending on the selection of the number of teeth and the speed of the input drive motor 80. The preferred embodiment as illustrated shows two stages only as being the most cost effective way of applying the instant invention.

Thus, the cam 63 will wobble within the opening 52 of the second stage gear 50 thus causing the second stage gear 50 to wobble about the interior of housing 20 and thus result in an output speed substantially reduced from the input speed of the drive motor. In the preferred embodiment the motor 80 operates at approximately 3600 RPM and the motor will revolve in the direction V1. The motion of the motor will be passed on through spindle 83 through to cam 84, which will wobble within the opening 72 of first stage gear 70. The absence of one tooth on the first stage gear in relation to the teeth within the interior of housing 20 will cause the gear reduction in the ratio of 1:60 of the speed of spindle 83, thus resulting in an output speed of the first stage gear at 60 revolutions per minute in a direction V2 opposite to the direction V1 of drive spindle 83. Such rotation of the first stage gear 70 will be passed on through the cam surface 63 of carrier plate 60 through pins 64 to the second stage gear 50, the cam portion 63 causing the second stage gear 50 to wobble about the interior of the housing 20. The second stage gear 50 having 60 teeth thereupon, one less than that found within the housing 20 thus resulting in a further reduction of the output speed of the first stage gear 70 passed on through the carrier plate 60 by a ratio of 1:60 thus ending in the rotation of the second stage gear in a direction V3 at an output speed of one revolution per minute.

Such output speed of the second stage gear 50 will be passed on through the arcuate pin portions 55 of the aforementioned gear, said arucate pin portions passing through the elongated arcuate openings 45 of the end plate 40 and being affixed at threaded openings 56 to the seat back bracket 12 allowing for the movement of the seat back as illustrated in FIG. 1. The arcuate pins 55 are designed to have optimum strength when formed to be able to transmit the formidable torque developed by the reduction unit by reducing the speed of the motor and thus increasing the torque of the entire reduction unit. As a result of the torque bearing requirements of the second stage gear, the second stage gear is fabricated from metal in one piece including the manufacture of the arcuate pins found thereupon, upon the side remote the motor. In the preferred embodiment, the gear will be manufactured by a metal sintering process. However, it is possible that the gear may be made from any other material which would stand up over time to the load applied by the reduction unit and specifically carry the torque applied thereupon. A mounting plate 30 is provided at the end of the reduction unit remote the electric motor 80 for mounting through the openings of an end plate 40, the housing 20, the second stage gear 50, the carrier plate 60, the first stage gear 70 and the spindle 83.

As discussed within the prior art in the background of the invention, the taumel process is well known. However, the reduction device of the instant invention has provided a double reduction unit using the taumel principle and thereby providing a module or reduction unit which will readily fit into limited spaces. It is not, of course, intended that the instant invention be used only with a seat recliner, but that a seat recliner is a preferred embodiment of the instant invention.

Figure 4:
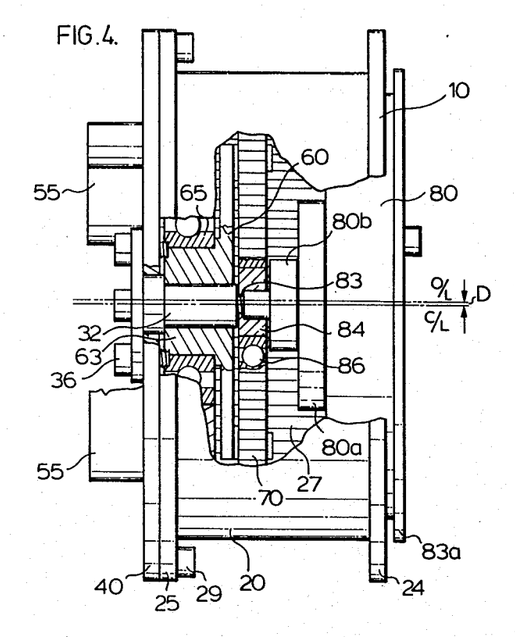
FIG. 4 is a partially cut away top view of the reduction device fully assembled with all of the portions intermeshing in a preferred embodiment of the invention.
Figure 5:
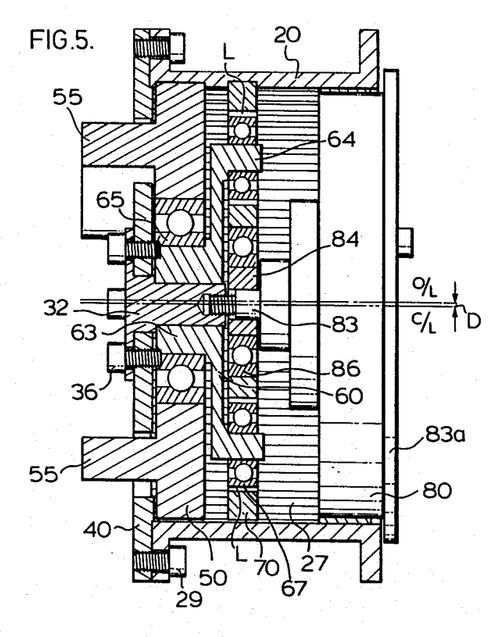
FIG. 5 illustrates the same view as FIG. 4 cut away to illustrate the complete interrelationship of all components thereof in a preferred embodiment of the invention.

Referring now to FIGS. 4 and 5, the entire reduction unit 10 is illustrated fully assembled, and shown in cut away and cross sections and FIG. 4 and 5 respectively, having a motor 80 being a flat motor disposed at one end of the housing 20 when assembled. The flat motor being of particularly useful advantage when a limited amount of space is available for the installation of the reduction unit. The reduction unit, however, is not limited to the seat recliner and may be used in other embodiments of the invention without the flat motor. The spindle 83 extends from the motor 80 to the cam 84, said cam having a center line OL offset from the center line CL of the spindle a distance of .833 mm or D as illustrated in the FIGS. 4 and 5. The rotation of the offset cam 84 about spindle 83 will cause the first stage gear 70 to wobble about the housing 20 and thus reduce the speed of the motor 80 by the well-known taumel principle, first stage gear 70 having one less tooth than the interior of the housing and thus rotating in an opposite direction in its output speed in relation to the input speed of the motor 80. A carrier plate 60 is affixed to the first stage gear 70 via pins 64 having bearing 67 circumscribing said pins, there being significant clearance L between the exterior of the opening 71 and the exterior of the bearing surfaces 67 to prevent the wobbling motion of the first stage gear 70 from being passed on to the carrier plate 60 as pins 64 wil be in communication with the interior of the opening 71 at any time, whereby the rotation of the first stage gear 70 will be passed on to the carrier plate 60 but not the wobbling effect. However, the speed of the first stage gear will be substantially reduced by a factor of 1:60, and in this specific instance to an output speed of 60 RPM from an input speed of 3600 RPM. The carrier plate 60 will then because of the offset center line OL of the cam 63 pass on to the second stage gear 50 the wobbling effect exactly as was passed on through to the first stage gear. Such reduction thus will result in an output speed of approximately 1 RPM which will be passed on through to the arcuate pins 55 which may be readily affixed to any lever or frame member, and in the preferred embodiment a seat back. Thus, the motion of the pins 55 in the arcuate slots 45 will cause the movement of the seat back in the predetermined direction as required by the seat occupant.

It is quite conceivable that the flat motor may be eliminated from the housing wherein an input shaft may take its place from a conventional motor remotely mounted, said shaft extending into the housing to drive the spindle 83 by alternative methods. For example a flexible cable may be used as is found within the seat adjusters known in the art. Alternatively, a conventional motor housing may be mounted remote the reduction unit with its shaft extending and being coupled to the reduction unit.

Figure 6:
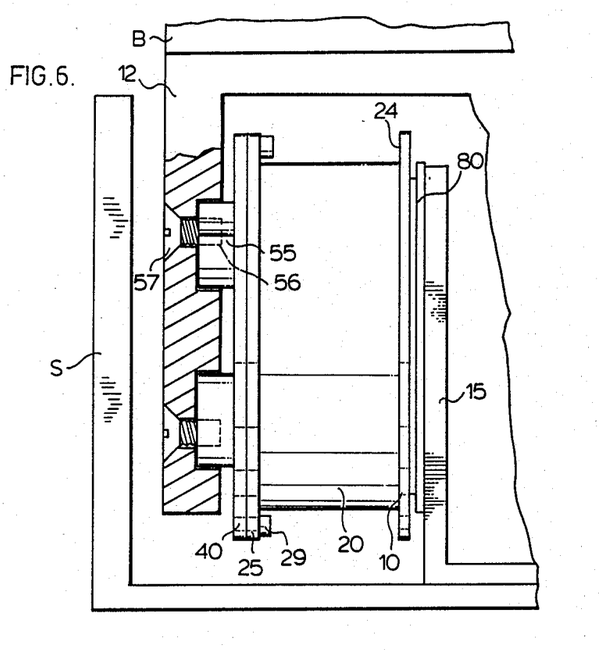
FIG. 6 is a close-up of the reduction device installede in FIGS. 1 and 2 to illustrate the mounting of the reduction device in a seat recliner in a preferred embodiment of the invention.

Referring now to FIG. 6, the reduction unit is illustrated mounted in a seat recliner as illustrated in FIGS. 1 and 2 having the arcuate pins 55 extending from the reduction unit 10 being mounted to the seat back bracket 12 at pins 57 being fastened into the openings 56 of the arcuate pins 55. Thus, it can be seen that the movement of the arcuate pins 55 in a clockwise direction will result in the motion of the seat back a corresponding distance. Thus, if the pins are moved through a range of 33 degrees as it is embodied in the preferred embodiment, then seat bracket 12 will move seat back B through the corresponding 33 degrees while the reduction unit remains fastened to the seat frame 15 of seat S.

Figure 7:
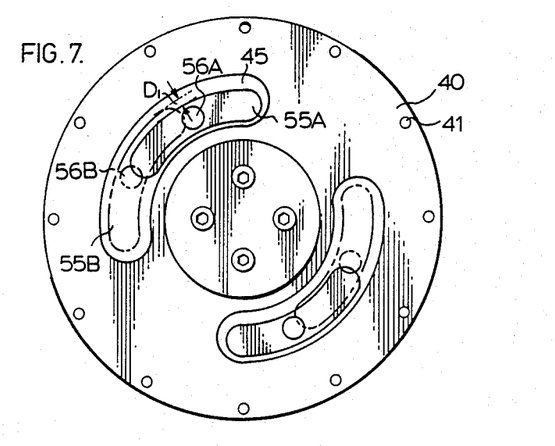
FIG. 7 is a close-up side view of the interrelationship between the drive pins 55 within the slots 45 of end plate 40 in a preferred embodiment of the invention.

Referring now to FIG. 7, the end plate 40 is illustrated having acruate slots 45 therein which define the limits of travel of the arcuate pins 55. Thus, as illustrated at one extreme in the most forward clockwise position, the arcuate pins will adopt the location 55A within arcuate slot 45 and will adopt the position 55B at its furthest counterclockwise position. As can be seen, there is a difference D1 in the depth within which the pin 55 will ride within the arcuate slot 45, such depth difference D1 being equivalent substantially to the twice amount of offset of the center line CL from the offset line OL or 1.666 mm. It is also suggested that the amount of play available in the openings 61 be of the same order of magnitude as the aforementioned difference. Thus, a play of 1 mm is established to allow for the slippage of the pins 64 within the openigns 71 of the first stage reduction gear 70. Thus, the clearance established within the arcuate slot 45 will allow for the amount of play or amplitude of wobble equivalent in the preferred embodiment to 1.67 mm of the second stage gear 50 and thus the arcuate pins 55. When the arucate pins 55 reach the limitations on either end of the elongated slot 45, the electric motor 80 will stall by design. The stalling of the electric motor may alternatively be avoided by providing a limit or alternative switches at the extremes of travel of the arcuate pin 55 within the slot 45. However, such stalling will not be as damaging to a reduction unit embodied as the instant invention, as to a standard transmission device.

Figure 8:
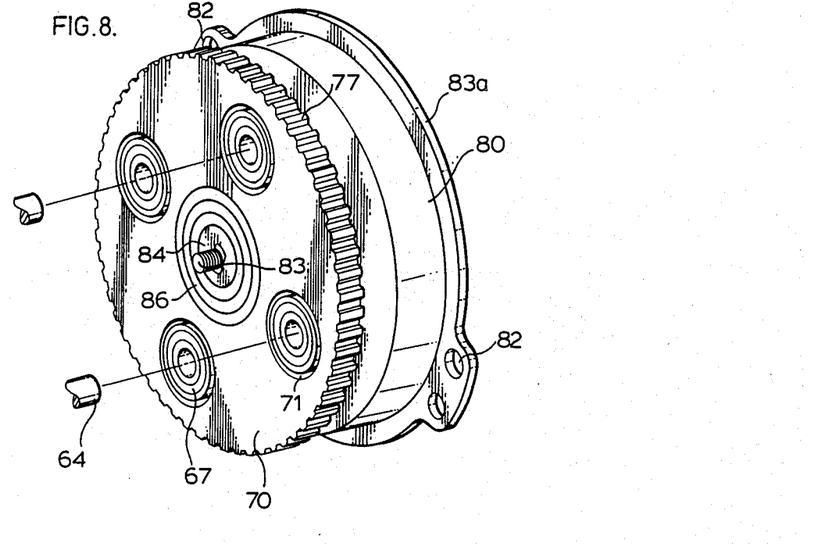
FIG. 8 is a partially exploded view of the motor and first stage gear when assembled prior to insertion within the housing 20 in a preferred embodiment of the invention.

Referring now to FIG. 8, the first stage gear 70 is illustrated assembled onto the spindle 83 and the cam 84 and bearing 86 of the flat motor 80 wherein the pins 64 of the carrier plate 60 will be inserted within the openings 71 of the first stage gear 70, the first stage gear being preferably formed of nylon or other suitable material and fitting abutting cylindrical portion 80B of the motor 80. Thus, it can be seen that quite a compact package may be obtained by the fitting together of the components of the reduction gear. The reduction unit in total may be embodied having an overall distance from the motor end plate 83A to the end plate 40 of between 4 to 6 cm and having a diameter of approximately 100 mm. Thus, it can be seen that the reduction unit is particularly advantageous in applications where space is a consideration. However, the reduction unit would be equally advantageous embodied strictly for the advantages of the modular approach to speed reduction. Such approach may be particularly useful in mechanisms to lift the hoods or trunk lids of vehicles. It is also possible to embody the instant invention in other non-automotive applications without departing from the scope of the invention.

Referring now to FIG. 9, the taumel gear principle is illustrated schematically wherein a difference D2 between the center line CL and the offset line OL is established, being approximately .833 mm, and wherein the number of teeth disposed upon the interior of the housing 20 at 27 is 61 teeth and the number of teeth 77 disposed within the first stage gear 70 is 60. Of course, it is understood that the tooth pitch must be substantially the same. Both gears will be engaged at all times, but as illustrated in FIG. 9 only engaged on one side thereof. It can be seen from FIG. 9 that the center line CL of the housing 20 is not the same as the offset center line OL of the wobbling first stage gear 70. As mentioned, the distance between the center lines is the offset which as a result of the cam surface 84 will establish the wobbling of the first stage gear about the interior of the housing 20. Because of the different in the number of teeth in the interior of the housing and to those disposed upon the first stage gear 70, the engagement point of the aforementioned gear with the housing will continually move 60 revolutions for each 60 revolutions of the cam 84. However, a specified tooth T1 will not be in the same valley Y1 upon such revolution.

It will have been shifted by one tooth because of the lagging of the first stage gear 70 as it moves about the interior teeth of housing 20. This lagging of the tooth T1 about the interior of the teeth 27 disposed within the housing will result in the opposite rotation of the first stage gear 70 in relation to the direction of rotation of the motor 80. Such a motion is well known within the art as the taumel gear principle.

Figure 10:
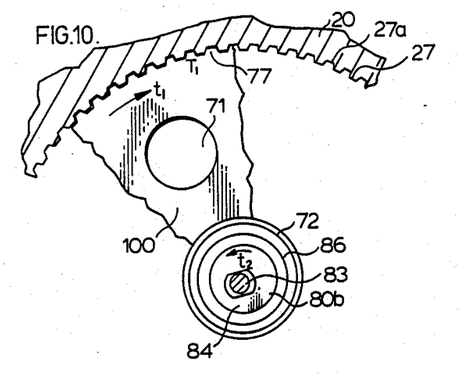
FIGS. 10, 11 and 12 illustrate the position of sector 100 as it wobbles about the circumference of the gears disposed upon the interior of housing 20 in a preferred embodiment of the invention.
Figure 11:
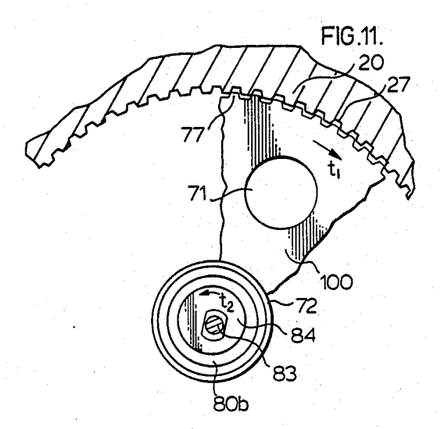
Figure 12:
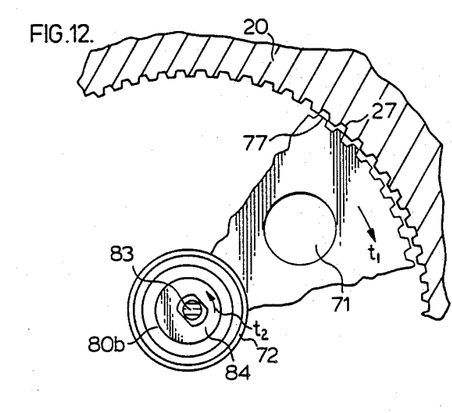

Referring now to FIGS. 10, 11 and 12, an arcuate sector 100 of the first gear 70 is illustrated moving in a direction T1 as the teeth 77 move within valleys 27A in response to the rotation of cam 84 in a direction T2 as a result of the aforementioned taumel principle. Thus, the sector 100 is engaged with the valleys 27A of the interior portion of housing 20 and moves from a position of engagement as illustrated in FIG. 10 to a position of partial engagement as illustrated in FIG. 11 to a position of full disengagement as illustrated in FIG. 12. Thus, the rotation of cam 84 will only be transmitted through to the wobbling first stage gear 70 at a position as illustrated in FIG. 10. However, it is not the taumel principle which the instant invention embodies but that of the double reduction incorporating the taumel principle. Thus, in relation to FIGS. 10, 11, 12 and 9, the entire description may be repeated in relation to the second stage gear as best seen in FIG. 3 resulting in a substantial reduction in the speed of the output second stage gear 50, but a considerable increase in the amount of torque established by the reduction unit 10.

A direct two-stage reduction unit has therefore been embodied having in the preferred embodiment a 60:1 reduction for the first stage and a 60:1 reduction for the second stage. The reduction unit has been provided in modular form as a flat package which may be used as embodied in the preferred embodiment but may further be used in alternative embodiments with or without ball bearings, and having alternative offset distances and wobbling amplitudes. Such offset distance being established by the number of teeth which the first and second stage gears have in relation to the number of teeth or valleys disposed within the interior of the housing for the reduction unit. It is further, of course, understood that the number of pick up pins embodied within the carrier plate 60 may be altered without departing from the scope of the invention, further the number and shape of the arcuate pins 55 may be varied without departing from the scope of the invention. There is, of course, a point in which the efficiency of the unit will be reduced substantially by increasing the amount of wobbling as smoothness of operation is of course a primary concern.

As an alternative of the 3600 RPM motor, a 2800 RPM motor may be considered for application within the instant invention. In doing so, of course, the output speeds of the first stage and second stage gears will have to be calculated and the number of teeth will have to be determined and will vary with each application. For a standard 2800 RPM motor, again the application and the calculations will have to be determined in order to establish the number of teeth on each of the respective gears in relation to the housing. There is a danger if the design of the reduction unit incorporates a one tooth difference in that the gear in the housing may bit and bind. Thus, the teeth in the preferred embodiment have been made shorter in order to eliminate this biting and binding resulting in the one tooth difference. However, a two or three tooth difference would eliminate the binding and biting, and thus alternative teeth designs may be used. It is, of course, very important that the teeth and the valleys disposed upon the gear segments and the housing are compatible and that they mesh.

As many changes can be made to the preferred embodiments of the invention without departing from the scope of the invention, it is intended that all matter contained herein be interpretted as illustrative of the invention and not in a limiting sense.

The embodiments of the invention in which an exclusive property or privilege is claimed are as follows:

1. A modular taumel reduction device comprising a housing having an exterior surface, interior surface and at least two ends, the housing having an opening extending from end to end along a first axis of extension through the opening of the housing, the housing having mounting means disposed proximate the exterior surface thereof, the interior surface of the housing having a multiplicity of detent means disposed thereupon, the housing having disposed at one end thereof driving means extending at least partially into the opening of the housing, the driving means having first engagement means extending therefrom proximate the housing for engagement with a first driven means, the first driven means being contained within the housing and having compatible detent means disposed about its perimeter for communication with the detent means disposed on the interior surface of the housing, the first driven means having fewer numbered compatible detent means than those disposed upon the interior surface of the housing or being smaller in diameter than said opening of said housing, the first driven means having second engagement means extending therefrom in a direction substantially parallel to the extension of the first engagement means, the second engagement means for engagement with a second driven means, the second driven means being contained within the housing having compatible detent means disposed about its perimeter for communication with the detent means disposed on the interior surface of the housing, the second driven means having fewer numbered compatible detent means than those disposed upon the interior surface of the housing or being smaller in diameter than said opening of said housing, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the detent means of the first driven means intermittently engages the detent means upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the detent means of the second driven means intermittently engages the detent means upon the interior of the housing, such intermittent engagement being predetermined to effect a reduction in the speed of the second driven means with respect to the first driven means, the second driven means thereby driving the third engagement means thereof to engage at least a third driven means, a moveable frame, or lever at a substantially reduced output speed to that of the speed of the driving means.

2. For use in a seat recliner a modular taumel reduction device comprising a housing having an exterior surface, interior surface and at least two ends, the housing having an opening extending from end to end along a first axis for extension through the opening of the housing, the housing having mounting means disposed proximate the exterior surface thereof, the interior surface of the housing having a multiplicity of detent means disposed thereupon, the housing having disposed at one end thereof driving means extending at least partially into the opening of the housing, the driving means having first engagement means extending therefrom proximate the housing for engagement with a first driven means, the first driven means being contained within the housing and having compatible detent means disposed about its perimeter for communication with the detent means disposed on the interior surface of the housing, the first driven means having fewer numbered compatible detent means than those disposed upon the interior surface of the housing or being smaller in diameter than said opening of said housing, the first driven means having second engagement means extending therefrom in a direction substantially parallel to the extension of the first engagement means, the second engagement means for engagement with a second driven means, the second driven means being contained within the housing having compatible detent means disposed about its perimeter for communication with the detent means disposed on the interior surface of the housing, the second driven means having fewer numbered compatible detent means than those disposed upon the interior surface of the housing or being smaller in diameter than said opening of said housing, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the detent means of the first driven means intermittently engages the detent means upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the detent means of the second driven means intermittently engages the detent means upon the interior of the housing, such intermittent engagement being predetermined to effect a reduction in the speed of the second driven means with respect to the first driven means, the second driven means thereby driving the third engagement means thereof to engage at least a third driven means, a moveable frame or lever in communication with the seat recliner at a substantially reduced output speed to that of the speed of the driving means.

3. The reduction unit of claim 1 or 2 wherein the driven means are gears.

4. The reduction unit of claim 1 or 2 comprising a remote driving means in communication with the reduction unit by a drive shaft engaging the reduction unit.

5. The reduction unit of claim 4 comprising first and second driven means of substantially equivalent diameters whereby the second and third axes are substantially coincident.

6. The reduction unit of claim 5 comprising first engagement means comprising an eccentric cam in communication with the driving means.

7. The reduction unit of claim 4 comprising third engagement means comprising at least one arcuate pin extending outwardly away from the second driven means remote the driving means.

8. The reduction unit of claim 4 comprising second engagement means comprising a carrier plate having at one end thereof at least one pin extending therefrom proximate the first driven means for engagement therewith, and having extending therefrom at the other end remote the first driven means an eccentric cam in communication with the second driven means.

9. The reduction unit of claim 4 comprising an end plate closing the housing at the end thereof remote the driving means, the end plate having compatible arcuate slots therein to determine the extent of movement of the at least one arcuate pin extending outwardly from the second driven means remote the driving means.

10. The reduction unit of claim 4 comprising driven means comprising an electric motor embodying a rare earth magnet, for example a neodymium magnet, providing higher density flux.

11. The reduction unit of claim 1 or 2 comprising first and second driven means of substantially equivalent diameters whereby the second and third axes are substantially coincident.

12. The reduction unit of claim 11 comprising first engagement means comprising an eccentric cam in communication with the driving means.

13. The reduction unit of claim 11 comprising third engagement means comprising at least one arcuate pin extending outwardly away from the second driven means remote the driving means.

14. The reduction unit of claim 11 comprising second engagement means comprising a carrier plate having at one end thereof at least one pin extending therefrom proximate the first driven means for engagement therewith, and having extending therefrom at the other end remote the first driven means an eccentric cam in communication with the second driven means.

15. The reduction unit of claim 11 comprising an end plate closing the housing at the end thereof remote the driving means, the end plate having compatible arcuate slots therein to determine the extent of movement of the at least one arcuate pin extending outwardly from the second driven means remote the driving means.

16. The reduction unit of claim 1 or 2 comprising first engagement means comprising an eccentric cam in communication with the driving means.

17. The reduction unit of claim 16 comprising third engagement means comprising at least one arcuate pin extending outwardly away from the second driven means remote the driving means.

18. The reduction unit of claim 16 comprising second engagement means comprising a carrier plate having at one end thereof at least one pin extending therefrom proximate the first driven means for engagement therewith, and having extending therefrom at the other end remote the first driven means an eccentric cam in communication with the second driven means.

19. The reduction unit of claim 16 comprising an end plate closing the housing at the end thereof remote the driving means, the end plate having compatible arcuate slots therein to determine the extent of movement of the at least one arcuate pin extending outwardly from the second driven means remote the driving means.

20. The reduction unit of claim 1 or 2 comprising third engagement means comprising at least one arcuate pin extending outwardly away from the second driven means remote the driving means.

21. The reduction unit of claim 20 comprising second engagement means comprising a carrier plate having at one end thereof at least one pin extending therefrom proximate the first driven means for engagement therewith, and having extending therefrom at the other end remote the first driven means an eccentric cam in communication with the second driven means.

22. The reduction unit of claim 20 comprising an end plate closing the housing at the end thereof remote the driving means, the end plate having compatible arcuate slots therein to determine the extent of movement of the at least one arcuate pin extending outwardly from the second driven means remote the driving means.

23. The reduction unit of claim 20 comprising driving means comprising an electric motor embodying a rare earth magnet, for example a neodymium magnet, providing higher density flux.

24. The reduction unit of claim 1 or 2 comprising some components manufactured from sintered metal.

25. The reduction unit of claim 24 comprising second engagement means comprising a carrier plate having at one end thereof at least one pin extending therefrom proximate the first driven means for engagement therewith, and having extending therefrom at the other end remote the first driven means an eccentric cam in communication with the second driven means.

26. The reduction unit of claim 24 comprising an end plate closing the housing at the end thereof remote the driving means, the end plate having compatible arcuate slots therein to determine the extent of movement of the at least one arcuate pin extending outwardly from the second driven means remote the driving means.

27. The reduction unit of claim 1 or 2 comprising second engagement means comprising a carrier plate having at one end thereof at least one pin extending therefrom proximate the first driven means for engagement therewith, and having extending therefrom at the other end remote the first driven means an eccentric cam in communication with the second driven means.

28. The reduction unit of claim 27 comprising an end plate closing the housing at the end thereof remote the driving means, the end plate having compatible arcuate slots therein to determine the extent of movement of the at least one arcuate pin extending outwardly from the second driven means remote the driving means.

29. The reduction unit of claim 27 comprising driven means comprising an electric motor embodying a rare earth magnet, for example a neodymium magnet, providing higher density flux.

30. The reduction unit of claim 1 or 2 comprising some components manufactured from resilient non-metallic materials.

31. The reduction unit of claim 30 comprising an end plate closing the housing at the end thereof remote the driving means, the end plate having compatible arcuate slots therein to determine the extent of movement of the at least one arcuate pin extending outwardly from the second driven means remote the driving means.

32. The reduction unit of claim 1 or 2 comprising an end plate closing the housing at the end thereof remote the driving means, the end plate having compatible arcuate slots therein to determine the extent of movement of the at least one arcuate pin extending outwardly from the second driven means remote the driven means.

33. The reduction unit of claim 32 comprising driving means comprising an electric motor embodying a rare earth magnet, for example a neodymium magnet, providing higher density flux.

34. The reduction unit of claim 1 or 2 comprising driving means comprising an electric motor embodying a rare earth magnet, for example a neodymium magnet, providing higher density flux.

35. A modular taumel gear reduction device comprising a housing having an exterior surface, interior surface and at least two ends, the housing having an opening extending from end to end along a first axis of extension through the opening of the housing, the housing having mounting means disposed proximate the exterior surface thereof, the interior surface of the housing having a multiplicity of teeth disposed thereupon, the housing having disposed at one end thereof driving means extending at least partially into the opening of the housing, the driving means having first engagement means extending therefrom proximate the housing for engagement with a first driven means, the first driven means being contained within the housing and having compatible teeth disposed about its perimeter for communication with the teeth disposed on the interior surface of the housing, the first driven means having fewer numbered compatible teeth than those disposed upon the interior surface of the housing, the first driven means having second engagement means extending therefrom in a direction substantially parallel to the extension of the first engagement means, the second engagement means for engagement with a second driven means, the second driven means being contained within the housing having compatible teeth disposed about its perimeter for communication with the teeth disposed on the interior surface of the housing, the second driven means having fewer numbered compatible teeth than those disposed upon the interior surface of the housing, the second driven means having third engagement means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the teeth of the first driven means intermittently engage the teeth disposed upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the teeth of the second driven means intermittently engages the teeth disposed upon the interior of the housing, such intermittent engagement being predetermined to effect a reduction in the speed of the second driven means with respect to the first driven means, the second driven means thereby driving the third engagement means thereof to engage at least a third driven means, a moveable frame, or lever at a substantially reduced output speed to that of the speed of the driving means.

36. For use in a seat recliner a modular taumel gear reduction device comprising a housing having an exterior surface, interior surface and at least two ends, the housing having an opening extending from end to end along a first axis of extension through the opening of the housing, the housing having mounting means disposed proximate the exterior surface thereof, the interior surface of the housing having a multiplicity of teeth disposed thereupon, the housing having disposed at one end thereof driving means extending at least partially into the opening of the housing, the driving means having first engagement means extending therefrom proximate the housing for engagement with a first driven means, the first driven means being contained within the housing and having compatible teeth disposed about its perimeter for communication with the teeth disposed on the interior surface of the housing, the first driven means having fewer numbered compatible teeth than those disposed upon the interior surface of the housing, the first driven means having second engagement means extending therefrom in a direction substantially parallel to the extension of the first engagement means, the second engagement means for engagement with a second driven means, the second driven means being contained within the housing having compatible teeth disposed about its perimeter for communication with the teeth disposed on the interior surface of the housing, the second driven means having fewer numbered compatible teeth than those disposed upon the interior surface of the housing, the second driven means having third engagment means extending therefrom in a direction substantially parallel to the extension of the first and second engagement means, the third engagement means for engagement with at least a third driven means or a moveable frame or lever; whereby when the driving means drives the first engagement means to engage the first driven means such engagement will result in the wobbling of the first driven means within the housing as the teeth of the first driven means intermittently engage the teeth disposed upon the interior of the housing, such intermittent engagement being predetermined to effect a reduction in the speed of the first driven means with respect to the driving means, the first driven means thereby driving the second engagement means thereof to engage the second driven means, such engagement resulting in the wobbling of the second driven means within the housing as the teeth of the second driven means intermittently engage the teeth disposed upon the interior of the housing, such intermittent engagement being predetermined to effect a reduction in the speed of the second driven means with respect to the first driven means, the second driven means thereby driving the third engagement means thereof to engage at least a third driven means, a moveable frame, or lever in communication with the seat recliner at a substantially reduced output speed to that of the speed of the driving means.

37. The reduction unit of claim 35 or 36 wherein the driven means are gears.

38. The reduction unit of claim 35 or 36 comprising a remote driving means in communication with the reduction unit by a drive shaft engaging the reduction unit.

39. The reduction unit of claim 38 comprising driving means comprising an electric motor embodying a rare earth magnet, for example a neodymium magnet, providing higher density flux.

40. The reduction unit of claim 35 or 36 comprising first engagement means comprising an eccentric cam in communication with the driving means.

41. The reduction unit of claim 40 comprising third engagement means comprising at least one arcuate pin extending outwardly away from the second driven means remote the driving means.

42. The reduction unit of claim 40 comprising second engagement means comprising a carrier plate having at one end thereof at least one pin extending therefrom proximate the first driven means for engagement therewith, and having extending therefrom at the other end remote the first driven means an eccentric cam in communication with the second driven means.

43. The reduction unit of claim 40 comprising an end plate closing the housing at the end thereof remote the driving means, the end plate having compatible arcuate slots therein to determine the extent of movement of the at least one arcuate pin extending outwardly from the second driven means remote the driving means.

44. The reduction unit of claim 35 or 36 comprising third engagement means comprising at least one arcuate pin extending outwardly away from the second driven means remote the driving means.

45. The reduction unit of claim 44 comprising second engagement means comprising a carrier plate having at one end thereof at least one pin extending therefrom proximate the first driven means for engagement therewith, and having extending therefrom at the other end remote the first driven means an eccentric cam in communication with the second driven means.

46. The reduction unit of claim 44 comprising an end plate closing the housing at the end thereof remote the driving means, the end plate having compatible arcuate slots therein to determine the extent of movement of the at least one arcuate pin extending outwardly from the second driven means remote the driving means.

47. The reduction unit of claim 44 comprising driving means comprising an electric motor embodying a rare earth magnet, for example a neodymium magnet, providing higher density flux.

48. The reduction unit of claim 35 or 36 comprising some components manufactured from sintered metal.

49. The reduction unit of claim 48 comprising second engagement means comprising a carrier plate having at one end thereof at least one pin extending therefrom proximate the first driven means for engagement therewith, and having extending therefrom at the other end remote the first driven means an eccentric cam in communication with the second driven means.

50. The reduction unit of claim 48 comprising an end plate closing the housing at the end thereof remote the driving means, the end plate having compatible arcuate slots therein to determine the extent of movement of the at least one arcuate pin extending outwardly from the second driven means remote the driving means.

51. The reduction unit of claim 35 or 36 comprising second engagement means comprising a carrier plate having at one end thereof at least one pin extending therefrom proximate the first driven means for engagement therewith, and having extending therefrom at the other end remote the first driven means an eccentric cam in communication with the second driven means.

52. The reduction unit of claim 51 comprising an end plate closing the housing at the end thereof remote the driving means, the end plate having compatible arcuate slots therein to determine the extent of movement of the at least one arcuate pin extending outwardly from the second driven means remote the driving means.

53. The reduction unit of claim 51 comprising driving means comprising an electric motor embodying a rare earth magnet, for example a neodymium magnet, providing higher density flux.

54. The reduction unit of claim 35 or 36 comprising some components manufactured from resilient non-metallic materials.

55. The reduction unit of claim 54 comprising an end plate closing the housing at the end thereof remote the driving means, the end plate having compatible arcuate slots therein to determine the extent of movement of the at least one arcuate pin extending outwardly from the second driven means remote the driving means.

56. The reduction unit of claim 35 or 36 comprising an end plate closing the housing at the end thereof remote the driving means, the end plate having compatible arcuate slots therein to determine the extent of movement of the at least one arcuate pin extending outwardly from the second driven means remote the driven means.

57. The reduction unit of claim 56 comprising driving means comprising an electric motor embodying a rare earth magnet, for example a neodymium magnet, providing higher density flux.

58. The reduction unit of claim 35 or 36 comprising driving means comprising an electric motor embodying a rare earth magnet, for example a neodymium magnet, providing higher density flux.

* * * * *